(12) United States Patent
Diebler et al.

(10) Patent No.: US 8,484,694 B2
(45) Date of Patent: Jul. 9, 2013

(54) SYSTEMS AND METHODS FOR PERFORMING REMOTE CONFIGURATION COMPLIANCE ASSESSMENT OF A NETWORKED COMPUTER DEVICE

(75) Inventors: Sebastien Diebler, Redwood City, CA (US); Bharat Patel, Redwood City, CA (US); Wolfgang Kandek, Palo Alto, CA (US); Holger Kruse, San Mateo, CA (US); Amol Sarwate, Redwood Shores, CA (US); Thomas Sola, San Francisco, CA (US)

(73) Assignee: Qualys, Inc., Redwood Shores, CA (US)

( * ) Notice: Subject to any disclaimer, the term of this patent is extended or adjusted under 35 U.S.C. 154(b) by 674 days.

(21) Appl. No.: 12/635,673

(22) Filed: Dec. 10, 2009

(65) Prior Publication Data

US 2010/0175106 A1    Jul. 8, 2010

Related U.S. Application Data

(60) Provisional application No. 61/121,278, filed on Dec. 10, 2008.

(51) Int. Cl.
*H04L 29/06* (2006.01)

(52) U.S. Cl.
USPC .................................. 726/1; 726/2; 379/189

(58) Field of Classification Search
USPC ............................................... 713/201; 726/2
See application file for complete search history.

(56) References Cited

U.S. PATENT DOCUMENTS

| 6,226,372 | B1 * | 5/2001 | Beebe et al. | 379/189 |
| 7,526,792 | B2 * | 4/2009 | Ross | 726/2 |

* cited by examiner

*Primary Examiner* — Nathan Flynn
*Assistant Examiner* — Phuoc Tran
(74) *Attorney, Agent, or Firm* — Baker & Mckenzie LLP

(57) ABSTRACT

The disclosed principles describe systems and methods for assessing the policy compliance of a target device, wherein the assessment is performed by a scanning computer in communication with the target device via a communication network. By employing a system or method in accordance with the disclosed principles, distinct advantages are achieved. Specifically, conducting such a remote scan allows for the scanner computer to perform a remote scan of the remote device without installing client software to the remote device. Also, conducting a compliance assessment according to the disclosed principles allows for the target device to be assessed after policy updates and changes, without requiring the target device to be re-scanned. Thus, the disclosed principles reduce the need for internal IT resources to manage the assessment and updates of client configuration settings on the target device.

28 Claims, 3 Drawing Sheets

Policy Editor

[+] Add Cover Page  [+] Set Technologies  [+] Add Section  [+] Add Controls  [+] Assign Assets My Windows Policy  ⊗ Section  ⊕ Controls

Section 1 : Password Management

1.1  1071  Passwords shall have a minimum length  ⊗ Control
⊕ Technology

Windows XP desktop  ⊗ Technology
If minimum password standards are not enforced by the system's technical configuration, it is unlikely that such standards shall be met.
The integer value X shows the minimum number of characters required in the password.
[greater than or equal to ▾]  [8]

Windows 2003 Server  ⊗ Technology
If minimum password standards are not enforced by the system's technical configuration, it is unlikely that such standards shall be met.
The integer value X shows the minimum number of characters required in the password.
[greater than or equal to ▾]  [8]

1.2  1318  A password shall not be reused until at least twenty-four other passwords have been used  ⊗ Control
⊕ Technology

Windows XP desktop  ⊗ Technology
If password history standards are not enforced by the system's technical configuration, a malicious user could guess a password and gain unauthorized access to sensitive information.

Windows 2003 Server  ⊗ Technology
If password history standards are not enforced by the system's technical configuration, a malicious user could guess a password and gain unauthorized access to sensitive information.

[Save]  [Save As...]  [Cancel]  [Help]

Controls - Mozilla Firefox

File  Edit  View  History  Bookmarks  Yahoo!  Tools  Help https://qualysguard.qualys.com/fo/tools/controls.php Patricia A Smith (quays_ps2) | Log out New  Search  View▼  Setup▼  Help▼

Controls

| View | Edit | CID | Statement | Category | Modified |
|---|---|---|---|---|---|
| 🔍 | | 1238 | .rhost files shall not be used or supported by the host authentication methods | Authentication | 12/16/2007 |
| 🔍 | | 1146 | Access to DBMS_RANDOM packages shall be restricted to PUBLIC | Security Management | 12/09/2007 |
| 🔍 | | 1069 | Access to SYS.AUD$ shall be restricted | Security Management | 12/13/2007 |
| 🔍 | | 1075 | Access to SYS.USER_HISTORY$ shall be restricted | Security Management | 12/13/2007 |
| 🔍 | | 1236 | Access to the "su" command shall only be available to users in the "wheel" group | Authentication | 12/09/2007 |
| 🔍 | | 1044 | Access to the data dictionary shall only be by privileged control | Security Management | 12/11/2007 |
| 🔍 | | 1171 | Administrative shares shall be disabled on workstations | Security Management | 12/10/2007 |
| 🔍 | | 1062 | All default accounts shall be locked and expired | Security Management | 12/13/2007 |
| 🔍 | | 1118 | ALTER SYSTEM privilege shall be restricted | Security Management | 12/05/2007 |
| 🔍 | | 1197 | Anonymous enumeration of SAM accounts and shares shall not be allowed | Security Management | 12/10/2007 |
| 🔍 | | 1241 | Anonymous root logins shall be restricted | Security Management | 12/16/2007 |
| 🔍 | | 1160 | Anti-Virus software shall be loaded and configured to prevent potential virus attacks | Anti-Virus/Malware | 12/09/2007 |
| 🔍 | | 1318 | A password shall not be reused until at least twenty-four other passwords have been used | Authentication | 12/09/2007 |
| 🔍 | | 1132 | AUDIT SYSTEM privilege shall be restricted | Security Management | 12/05/2007 |
| 🔍 | | 1167 | Automatic execution of the system debugger shall be disabled | Security Management | 12/10/2007 |
| 🔍 | | 1169 | Automatic logon shall be disabled | Security Management | 12/10/2007 |
| 🔍 | | 1170 | Automatic reboots, after BSOD (Blue Screen of Death), shall be disabled | Security Management | 12/10/2007 |
| 🔍 | | 1113 | automount daemon shall be disabled | Security Management | 12/05/2007 |
| 🔍 | | 1168 | Autoplay for the default profile shall be disabled | Security Management | 12/10/2007 |

1-20 of 170

Please click on an item in above datalist to view its preview.

Navigation
- Dashboard
- Map
- Scan
- Schedule
- Report
- Exceptions
- Remediation
- Asset Search
- Risk Analysis

Tools
- Asset Groups
- Report Templates
- User Accounts
- Option Profiles
- Host Assets
- Domain Assets
- Remediation Policy
- Authentication
- Business Units
- Virtual Hosts
- KnowledgeBase

Policies
- Controls

Activity Log

0 of 170 Items Shown, 0 Selected

400

SYSTEMS AND METHODS FOR PERFORMING REMOTE CONFIGURATION COMPLIANCE ASSESSMENT OF A NETWORKED COMPUTER DEVICE

RELATED APPLICATIONS AND PRIORITY CLAIM

This application claims priority to U.S. Provisional Patent Application No. 61/121,278, filed Dec. 10, 2008, and which is commonly assigned with the present application in incorporated herein by reference in its entirety for all purposes.

TECHNICAL FIELD

Disclosed embodiments herein relate generally to electronic device policy compliance, and more particularly to systems and methods for remotely scanning a target device to perform an assessment of the device policy compliance.

BACKGROUND

Computer networks offer users ease and efficiency in exchanging information. Computer networks are typically comprised of integrated servers, routers, terminals and other components, interoperating and sharing information. Such networks manage a growing list of a variety of needs including transportation, commerce, energy management, communications, and defense.

Unfortunately, the very interoperability and sophisticated integration of technology that make computer networks such valuable assets also make them vulnerable to attack, and make dependence on networks a potential liability. Numerous examples of planned network attacks, such as viruses, worms, and spyware have shown how interconnectivity can be used to spread harmful program code. In addition, public or open network architectures, such as the Internet, permit hackers to have access to information on many different computers. These malicious attackers attempt to gain access to messages generated by a user's computer and to the resources of the user's computer, as well as to use knowledge regarding the operations of the protocol stack and operating systems of users' computers in an effort to gain access to their computers without authorization. Such illicit activity presents a significant security risk to any computer coupled to a network where a user for one computer may attempt to gain unauthorized access to resources on another computer of the network. Furthermore, organized groups have performed malicious and coordinated attacks against various large online targets.

In addition to security policy concerns, assessing local systems and networks to ensure they comply with additional policies is also desirable. For example, many corporate entities maintain strict internal policies, not just with regard to security from viruses, malware, or other malicious attacks intended to harm systems, but also from information-based attacks. For example, theft of corporate information by persons inside the company is an increasing concern in today's competitive marketplace. In addition, external persons may attempt to access internal information overtly or covertly, and policies may be implemented to prevent such breaches. Still further, companies may also choose to implement policies to prevent employees from merely accessing their personal email accounts, or simply surfing the Internet. Wasted employee time on such activities while on the company clocks continues to be an expensive problem for companies, and ensuring policies intended to prevent such abuses are in place is beneficial for such companies.

When assessing the security posture of an endpoint device such as a computer terminal or workstation, or even a local networked device such as a computer server, scanning software is typically used to determine if compliance with specific policies is being met by these target assets. Exemplary conventional techniques for scanning remote computer devices include deploying scanning software using a server in a client-server architecture. In this type of deployment, the scanning software conducts a network-based assessment of the target system, without any software installed on the endpoint computer device. Such a technique may be known as remote scanning. Another conventional approach is when the scanning software is deployed on the local target system. In this type of deployment, the entire scanning software is a "thick client" installed on the local device that contains the scanning engine. Such a technique may be known as local scanning.

Regardless of the remote assessment technique employed, when conventional approaches are used to assess target systems to determine compliance with specific policies, later changes or updates to target systems made in order to comply with such policies require another scan in order to determine the updated status of the target. Obviously, performing a follow-up scan, or even additional scans if further policy updating has occurred, adds additional time to the overall policy compliance assessment. In addition, increasing the number of scans performed occupies valuable system resources at both ends of the scan, resources that could be better focused on other tasks. Accordingly, what is needed is a technique for assessing the policy compliance posture of target systems that conserves both scanning and target system resources, but that does not suffer from the deficiencies found in conventional approaches and techniques.

SUMMARY

Disclosed herein are methods and related systems for performing remote configuration compliance assessment on a target device across a computer network. In one embodiment, such a method may comprise providing a scanner computer in communication with a communication network, providing a target device in communication with the communication network, and establishing a network connection between the scanner computer and the target device across the communication network. Such an exemplary method may also comprise creating a policy affecting the control of one or more technologies and assigning the policy to the target device. The method may also include requesting configuration information from the target device, receiving the configuration information from the target device at the scanner computer over the communication network, and storing the configuration information in memory at the scanner computer. Further, the method may involve performing an evaluation of the posture of the target device at the scanner computer, wherein the evaluation is based at least in part on the configuration information received from the target device. Other embodiments of the disclosed method may involve performing a second evaluation of the posture of the target device based at least in part on the configuration information previously obtained from the target device and without requesting configuration information from the target device a second time, wherein the second evaluation is performed after the policy assigned to the target device has been modified and/or supplemented.

In another embodiment, a system for performing remote configuration compliance assessment on a target device across a computer network may be provided. In this exemplary embodiment, the system may comprise a scanner computer in communication with a communication network, as well as a target device in communication with the communication network. In such an embodiment, the scanner computer could be configured to establish a network connection between the scanner computer and the target device across the communication network. The scanner computer may be further configured to create a policy affecting the control of one or more technologies and assigning the policy to the target device. The scanner computer can be further configured to request configuration information from the target device, receive the configuration information from the target device over the communication network, and store the configuration information in memory. The scanner computer may then perform an evaluation of the posture of the target device, wherein the evaluation is based at least in part on the configuration information received from the target device. In some embodiments of the system, the scanner computer may perform a second evaluation of the posture of the target device based at least in part on the configuration information previously obtained from the target device and without requesting configuration information from the target device a second time, wherein the second evaluation is performed after the policy assigned to the target device has been modified and/or supplemented.

BRIEF DESCRIPTION OF THE DRAWINGS

FIG. 3 illustrates a screen shot of an exemplary policy editor in accordance with the disclosed principles; and FIG. 4 illustrates a screen shot of an exemplary list of technical controls in accordance with the disclosed principles.

DETAILED DESCRIPTION

The disclosed principles provide a remote scanning assessment device, for example embodied in a system and/or related method. The disclosed scanning technique is employed for remotely scanning and assessing the policy compliance posture of the computer assets of an enterprise. These computer assets may include servers and workstations, and the disclosed technique remotely assesses their compliance posture without the need to deploy any local agent on the target system. The disclosed system and method may be scaled to scan individual endpoint terminals all the way up to the largest networks.

The disclosed principles provide posture evaluation 'after the fact', meaning that a new scan is not required each time a particular policy is modified/updated. The disclosed technique intuitively gathers system configuration information centrally during the scanning assessment of the target assets, and evaluates that gathered system configuration information to determine or establish a current system configuration posture of each of the target assets. Once the initial scan has been done, the disclosed technique may then apply the policy compliance evaluation to the relevant assets, based on the system configuration information gathered during the scan, to ensure policy compliance by the configuration of the target assets.

Figure 1:
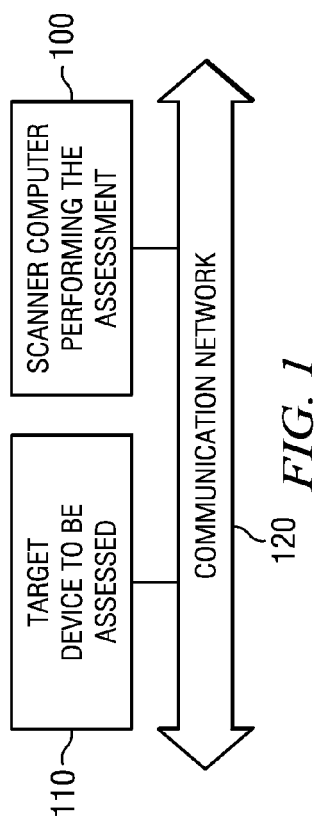
FIG. 1 illustrates a high level block diagram of one embodiment of a system constructed in accordance with the disclosed principles.

FIG. 1 illustrates one embodiment of the techniques disclosed herein. As shown in FIG. 1, scanner computer 100 is connected to target device 110 via a communication network 120. The scanner computer 100 is where the scanning application program resides and posture assessment is performed. The target device 110 can be any endpoint device connected to a network, such as a computer or mobile communication device. The network 120 can be any network connecting two devices, such as a Local Area Network (LAN), Wide Area Network (WAN), or the Internet. While a single target device 110 is illustrated in FIG. 1, the disclosed principles and techniques are of course expandable to multiple remote target devices 110.

Figure 2:
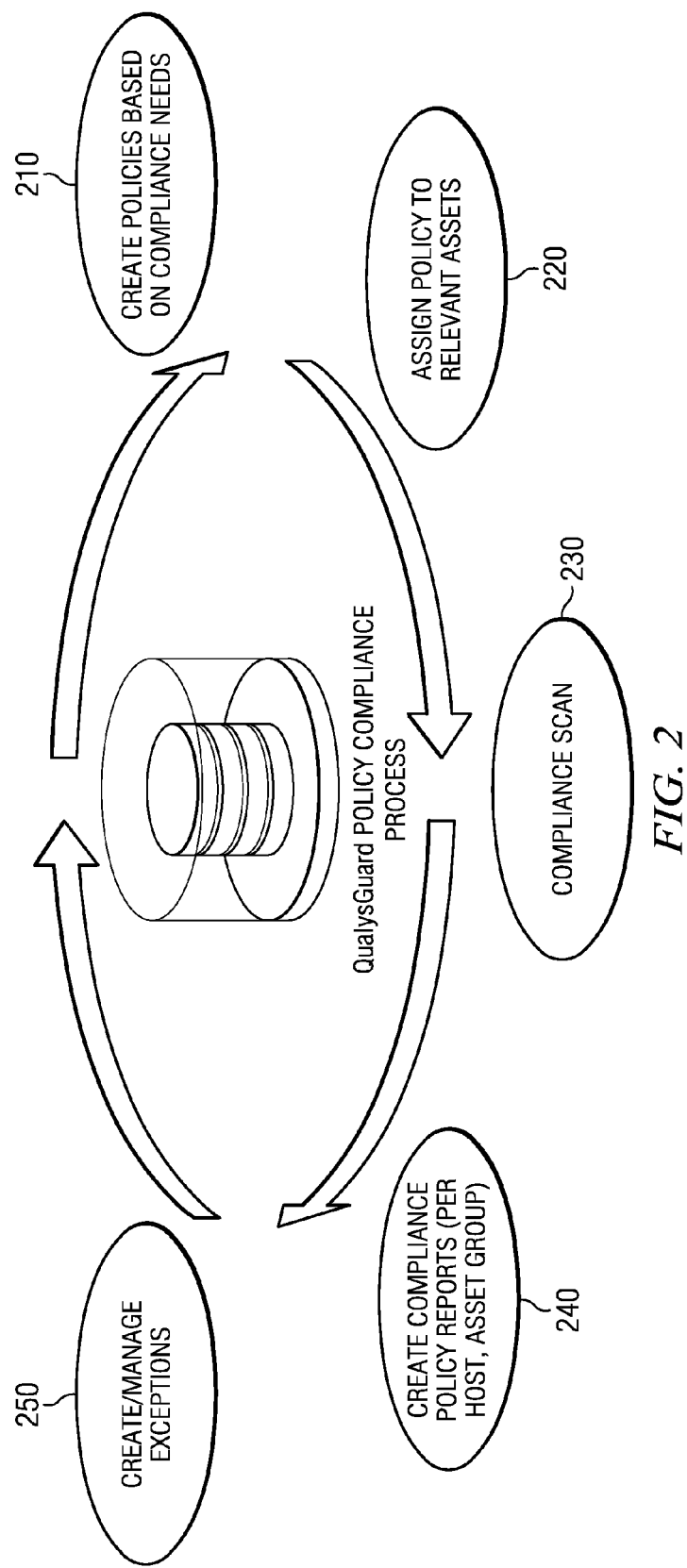
FIG. 2 illustrates a process flow diagram of an exemplary assessment of a target device conducted using the techniques of the disclosed principles.

In one embodiment of the disclosed principles, the system or process may be segmented into four different activities. These include:
1. Manage Policies
2. Gather configuration information
3. Evaluate posture
4. Report and manage exceptions FIG. 2 illustrates a conceptual view of an exemplary policy compliance process, as implemented under the QualysGuard name, which is commonly owned with the Assignee of the present disclosure. The four activities disclosed above are incorporated into FIG. 2, and are described in further detail below.

It should be noted that distinct actions or processes provided by the overall disclosed principles may be called something different in the relevant field, so it should be understood that the labels above or appearing in FIG. 2 are exemplary only, and are not intended to limit the disclosed principles in any way. Instead, it is the actions and processes provided in accordance with the disclosed principles themselves that encompass the present invention.

1. Manage Policies

In the context of the disclosed principles, a "policy" is defined as a list of technical controls for one or multiple technologies that apply to multiple computer-based assets. A policy may be created and edited using, for example, a WYSIWYG (What You See Is What You Get) editor, but of course other software may also be used for creating and modifying policies.

The technical controls are typically defined by a compliance management team or other entity, and cover industry standards and frameworks for the given industry of the target assets. This step is represented in FIG. 2 by node 210. A simple example of such a technical control is "Passwords should have a minimum-length requirement set according to security policy." While all technical controls typically have a threshold for determining pass or fail (i.e., compliance or non-compliance), some technical controls, such as the password length example just mentioned, can also have a threshold customizable by the user.

FIG. 3 illustrates an exemplary screenshot 300 of a policy editor implemented for managing and editing password policies. Password policies are merely one example of a technical control implemented by a compliance management team.

The technical controls defined by the policy are then assigned to the relevant target assets, as shown in node 220 of FIG. 2. The policy assigned to each asset can differ from one asset to another, as it may be dependant on the technology present in a particular asset. The term "technology" as used here may refer to, by way of example, an operating system (i.e., Microsoft Windows) or application (i.e., Oracle database 11g) running on the target asset(s). Target assets, or systems, are networked computers or devices that can be assessed by a remote scanning assessment system, such as the one that is the subject of the disclosed principles. This usually requires that the target's technologies be supported by the remote scanning/assessment product. This can occur if the scanning product is expressly compatible with the target's operating system or application. However, this can also occur if the remote scanning product has the capability to be compatible with any operating system, whether different from the scanning product or different among multiple targets of the scanning product within a single organization. Such a multi-capable remote scanning product has been developed by the Assignee of the present disclosure, and is disclosed in co-pending U.S. patent application Ser. No. 12/580,982, filed Oct. 16, 2009, which is incorporated herein by reference in its entirety for all purposes.

2. Gather Configuration Information

One aspect of the disclosed principles is a compliance scan of the target asset(s), which is used to gather configuration information of the asset(s). This is shown in FIG. 2 by node 230. For example, configuration information may include password policy (minimum length, complexity, history), user policy (ACL (Access Control List)), running services (authorized/non-authorized services like FTP, HTTP, Mail), installed application (banning Peer2Peer, Instant Messaging) or patch level.

FIG. 4 illustrates a screenshot 400 of some exemplary technical controls that may be implemented according to the disclosed principles. Of course, other types of configuration information of the target asset(s) may also be scanned and recorded by the disclosed scanning technique. The configuration information that is gathered gives the scanning device a holistic view of the asset(s), regardless of which technical control or policy the asset(s) is intended to employ. Moreover, a unit of configuration information is typically called a 'data point' when discussing the gathering of configuration information.

In addition, the type of scanning may vary with the disclosed approach. For example, "trusted scanning," in accordance with techniques developed by the Assignee of the present disclosure, may be employed whereby credentials to the asset(s) are provided to the scanning product, hence allowing the scanning product to perform its duty in a more accurate way.

3. Evaluate Posture

When new configuration information is obtained, for example after a compliance scan by the scanning product, or when a policy is created or edited, the remote scanning device performs a new evaluation of the posture of the target asset(s). Specifically, this is done by an evaluation, by the scanning device, of the gathered configuration information in order to determine if the configurations of the target asset(s) corresponding to the gathered configuration information is in compliance with the policy for that target asset(s). This new evaluation is in place of performing a new scan of the target asset(s), as the remote scanning device is already in possession of the configuration needed to perform the evaluation. Thus, the remote scanning device needs only to evaluate the compliance of the configuration information against the newly created or edited policies. This step of the process is also represented in FIG. 2 by node 230.

To simplify the creation of new technical controls for the target asset(s), the evaluation process has been normalized and is stored, for example, in an XML structure at the centralized location of the remote scanning product. An evaluation 'code' involves one or multiple data points (i.e., units of configuration information), their type (integer, string, Boolean, arrays), and their expected value. When multiple data points are used, Boolean operators (e.g., "and," "or," "not") may be used to link the data points. Accordingly, because a compliance scan by the disclosed remote scanning device retrieves a holistic view of an asset, modifying a policy of the asset does not require a new scan to trigger the evaluation of the posture of the asset in the face of policy changes.

4. Report and Manage Exceptions

To analyze the information collected and processed and evaluated by the disclosed remote scanning device, the user/subscriber of the device may then have the choice of different types of reports (node 240 of FIG. 2). For example, the subscriber may be provided a full policy information report, or a report drilling down by specific asset or control. Once a report has been provided to the subscriber, the subscribing company may then address the policy compliance problems identified by the disclosed techniques. Alternatively, the centralized entity implementing the disclosed scanning approach may itself execute a policy compliance update to one or more of the target assets, bringing such target(s) in line with the current policy.

In addition, the disclosed remote scanning technique also supports "exceptions" (node 250 of FIG. 2). Exceptions may be implemented to temporarily accept a target's risk of failing a technical control. Such an approach may be desired when no remediation or mitigating factors are available (e.g., requires a new patch or feature from a vendor), the remediation is not practical at the moment (e.g., usually due to production schedule), or the remediation might impact the proper execution of an application being handled by the asset. Moreover, the exceptions may be time-sensitive, with the disclosed product "re-evaluating" the target asset(s) given an exception after a predetermined period of time to determine if the target has in the interim complied with the policy at issue. If not, the product may then take any of the above actions with the regard to target assets determined to be noncompliant.

Based on the above information, the disclosed remote scanning technique for determining policy compliance of target assets provides significant improvements over currently known practices and published methods/systems. For example, some embodiments of the disclosed technique may perform its remote assessment securely by having credentials to the target asset(s), without requiring an agent to be deployed on the actual target system/client. In addition, some embodiments of the disclosed technique can collect configuration information during a single scan, and the compliance posture evaluation is then performed in the data center, instead of performing the posture evaluation during the scan. This allows a policy to be modified by a subscriber and the target re-evaluated for compliance with the modified policy without requiring a new scan of the target(s). Moreover, some embodiments of the disclosed technique may be centrally managed through a web interface.

Furthermore, the disclosed technique is scalable for use on a single system up to the largest network. The disclosed technique beneficially saves scanning resources, by performing a single scan of targets and not overburdening target assets with multiple scans. Such benefits are magnified as the number of targets significantly increases. As a result, the clear benefits of the disclosed technique escalate exponentially as the size of the target group increases. This can amount to significant resource savings on both sides of the scans when the subscriber has a large number of systems being evaluated.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for performing remote configuration compliance assessment on a target device across a computer network, the method comprising:
   providing a scanner computer in communication with a communication network;
   providing a target device in communication with the communication network;
   establishing a network connection between the scanner computer and the target device across the communication network;
   assigning, by the scanner computer, a policy affecting the control of one or more technologies of the target device to the target device;
   requesting configuration information of the target device from the target device;
   receiving the configuration information from the target device at the scanner computer across the communication network;
   storing the configuration information in memory at the scanner computer; and
   performing, at the scanner computer, an evaluation of the configuration information received from the target device to evaluate whether the configuration posture of the target device corresponding to the configuration information is in compliance with the assigned policy.

2. The method according to claim 1, further comprising:
   performing a second evaluation of the configuration information previously obtained from the target device when the policy assigned to the target device is modified, and without requesting configuration information from the target device a second time, to evaluate whether the configuration posture of the target device corresponding to the previously obtained configuration information is in compliance with the modified policy.

3. A method according to claim 1, further comprising:
   generating a compliance report describing the results of the evaluation of the posture of the target device.

4. A method according to claim 1, further comprising:
   modifying at least part of the configuration information of the target device, such that the modified configuration information is in compliance with the policy assigned to the target device.

5. A method according to claim 4, wherein the evaluating the configuration information further comprises determining that a part of the configuration information is not in compliance with the assigned policy but qualifies as a temporary exception to the assigned policy, wherein the part of the configuration posture of the target device corresponding to the exception is not immediately modified to comply with the assigned policy.

6. A method according to claim 5, further comprising:
   re-scanning the target device to obtain updated configuration information; and
   evaluating the updated configuration information in comparison with the part of the configuration information determined to qualify as an exception to determine if the posture of the target device corresponding to the updated configuration information now complies with the assigned policy.

7. A method according to claim 1 wherein the scanner computer is compatible with multiple technologies available for use by the target device.

8. A method according to claim 1, wherein an operating system of the scanner computer differs from an operating system of the target device.

9. A method according to claim 1, further comprising:
   providing to the scanner computer credentials belonging to the target device, the credentials authorizing the receiving of the configuration information of the target device.

10. A system for performing remote configuration compliance assessment on a target device across a computer network, the system comprising:
    a scanner computer in communication with a target device across a communication network, wherein the scanner computer is configured to:
       assign a policy affecting the control of one or more technologies of the target device to the target device;
       request configuration information of the target device from the target device;
       receive the configuration information from the target device across the communication network;
       store the configuration information in memory; and
       perform an evaluation of the configuration information received from the target device to evaluate whether the configuration posture of the target device corresponding to the configuration information is in compliance with the assigned policy.

11. A system according to claim 10, wherein the scanner computer is further configured to:
    perform a second evaluation of the configuration information previously obtained from the target device when the policy assigned to the target device is modified, and without requesting configuration information from the target device a second time, and
    evaluate whether the configuration posture of the target device corresponding to the previously obtained configuration information is in compliance with the modified policy.

12. A system according to claim 10, wherein the scanner computer is further configured to generate a compliance report describing the results of the evaluation of the posture of the target device.

13. A system according to claim 10, wherein the scanner computer is further configured to modify at least part of the configuration information of the target device, such that the modified configuration information is in compliance with the policy assigned to the target device.

14. A system according to claim 13, wherein the scanner computer is further configured to: determine that a part of the configuration information is not in compliance with the assigned policy but qualifies as a temporary exception to the assigned policy, wherein the part of the configuration posture of the target device corresponding to the exception is not immediately modified to comply with the assigned policy.

15. A system according to claim 14, wherein the scanner computer is further configured to:
re-scan the target device to obtain updated configuration information, and
evaluate the updated configuration information in comparison with the part of the configuration information determined to qualify as an exception to determine if the posture of the target device corresponding to the updated configuration information now complies with the assigned policy.

16. A system according to claim 10, wherein the scanner computer is compatible with multiple technologies available for use by the target device.

17. A system according to claim 10, wherein an operating system of the scanner computer differs from an operating system of the target device.

18. A system according to claim 10, wherein the scanner computer is further configured to receive credentials belonging to the target device, the credentials authorizing the receiving of the configuration information of the target device.

19. A method for performing remote configuration compliance assessment on a target device across a computer network, the method comprising:
providing a scanner computer in communication with a plurality of target devices across a communication network;
assigning, by the scanner computer, a policy affecting the control of one or more technologies of each of the plurality of target devices to each of the plurality of target devices;
receiving, at the scanner computer, configuration information for each of the plurality of target devices from each of the plurality of target devices across the communication network;
performing, at the scanner computer, a first evaluation of the configuration information received from each of the plurality of target devices to evaluate whether the configuration posture of each of the plurality of target devices is in compliance with its assigned policy;
modifying the assigned policy of the target devices; and
performing a second evaluation of the previously obtained configuration information for the target devices, without requesting configuration information for the target devices a second time, to evaluate whether the configuration posture of each of the plurality of target devices is in compliance with the modified policy.

20. A method according to claim 19, further comprising:
generating a compliance report describing the results of the first and/or second evaluation of the posture of the plurality of target devices.

21. A method according to claim 19, further comprising:
modifying at least part of the configuration information for one or more of the target devices, such that the modified configuration information is in compliance with its assigned policy.

22. A method according to claim 19, wherein the evaluating the configuration information further comprises determining that a part of the configuration information for one or more of the plurality of target devices is not in compliance with its assigned policy but qualifies as a temporary exception to that assigned policy, wherein the part of the configuration posture of the one or more target devices corresponding to the exception is not immediately modified to comply with the assigned policy.

23. A method according to claim 22, further comprising:
re-scanning the one or more target devices to obtain updated configuration information for the one or more target devices; and
evaluating the updated configuration information in comparison with the part of the configuration information determined to qualify as an exception to determine if the posture of the one or more target devices corresponding to the updated configuration information now complies with the assigned policy.

24. A method according to claim 19 wherein the scanner computer is compatible with multiple technologies available for use by the plurality of target devices.

25. A method according to claim 19 wherein an operating system of the scanner computer differs from an operating system of one or more of the target devices.

26. A method according to claim 19, further comprising providing to the scanner computer a set of credentials belonging to one or more of the target devices, the credentials authorizing the receiving of the configuration information of the one or more target devices.

27. A method for performing remote configuration compliance assessment on a target device across a computer network, the method comprising:
providing a scanner computer in communication with a target device across a communication network;
assigning, by the scanner computer, a policy affecting the control of one or more technologies of the target device to the target device;
receiving, at the scanner computer, a first configuration information for the target device from the target device across the communication network;
storing the first configuration information in memory at the scanner computer;
performing, at the scanner computer, an evaluation of the first configuration information received from the target device to evaluate whether a configuration posture of the target device corresponding to the first configuration information is in compliance with the assigned policy;
creating, by the scanner computer, a second configuration information for the target device based on a non-compliant evaluation of the first configuration information;
storing the second configuration information in memory at the scanner computer; and
performing, at the scanner computer, an evaluation of the second configuration information for the target device to evaluate whether a configuration posture of the target device corresponding to the second configuration information is in compliance with the assigned policy.

28. A method according to claim 27, wherein the second configuration information for the target device is created by modifying the stored first configuration information.

* * * * *